(Model.)
J. A. DAVIDSON.
Bathometer.
No. 242,278. Patented May 31, 1881.
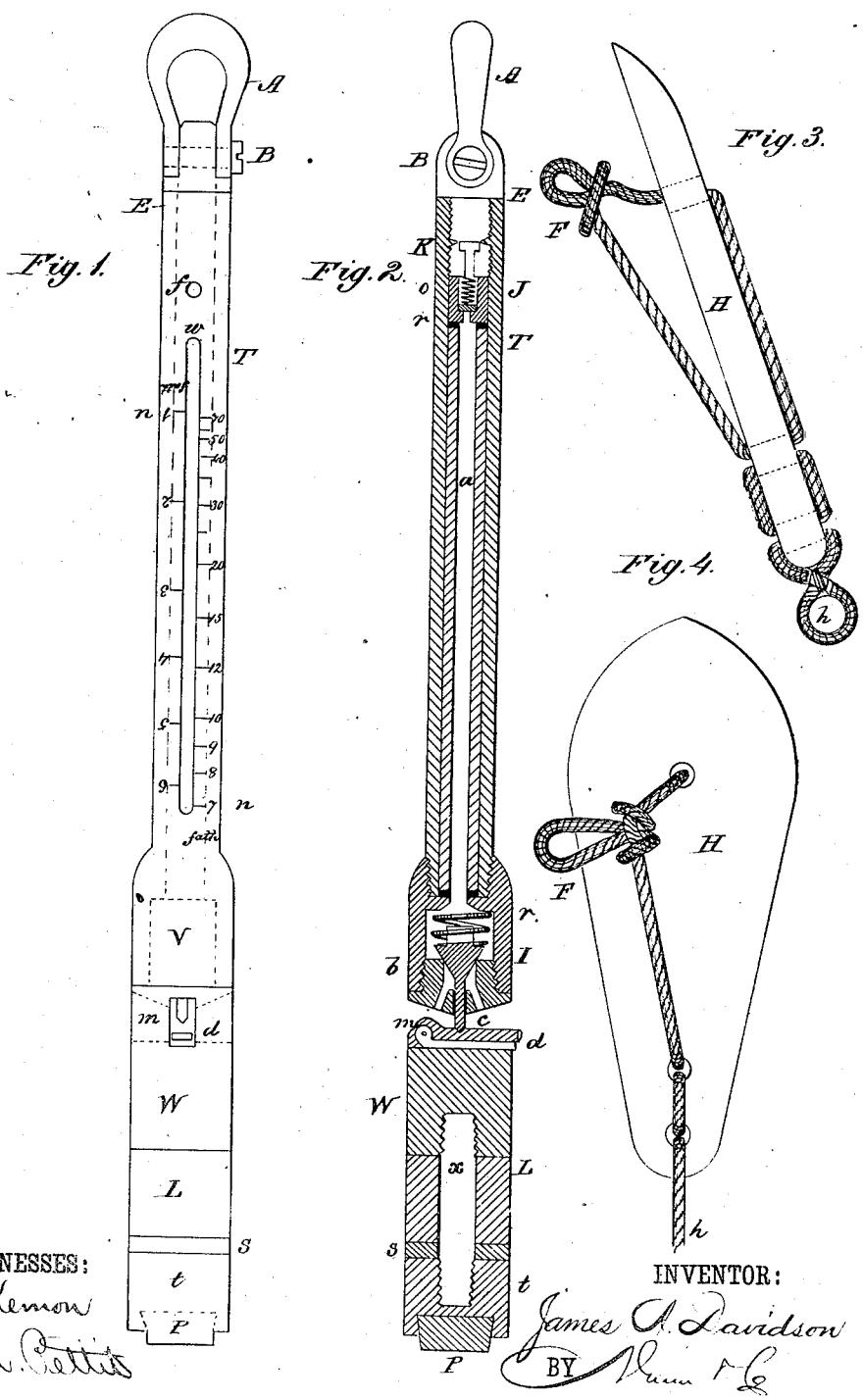
WITNESSES:
INVENTOR:
James A. Davidson
BY
ATTORNEYS.

UNITED STATES PATENT OFFICE.

JAMES A. DAVIDSON, OF COW BAY, NOVA SCOTIA, CANADA.

BATHOMETER.

SPECIFICATION forming part of Letters Patent No. 242,278, dated May 31, 1881.

Application filed April 13, 1881. (Model.)

*To all whom it may concern:*

Be it known that I, JAMES ARSCOTT DAVIDSON, a subject of the new Dominion of Canada, residing at Cow Bay, in the county of Cape Breton and Province of Nova Scotia, have invented a new and useful Sea-Sounding Indicator, of which the following is a specification.

My invention relates to improvements in instruments for sea-sounding, by which the depth of water is read from a graduated scale upon the instrument, instead of by the length of the line. By this invention soundings can be taken while the sailing-vessel or steamship is in motion as quickly as if the ship were at rest. The principle upon which the depth is found is by the weight of water due to its height, the weight being equalized by compressed air and the power of a spring. The indicator is provided with a heavy end, which keeps it upright in its descent and confines the air which becomes compressed until an equilibrium is found, and at that moment a spring closes a valve and stops the admission of water, so that if the indicator becomes inverted or falls horizontally the air cannot escape or take in water. A water-kite may be used in connection with the aforesaid, by which the indicator is held in a vertical position. I attain these objects by the mechanism illustrated in the accompanying drawings, in which—

Figure 1 is a perspective view of the indicator; Fig. 2, a vertical section of the same; Fig. 3, an edge view of the water-kite; Fig. 4, a side view of the same.

Similar letters refer to similar parts throughout the several views.

A is a shackle attached to plug E by the bolt B.

T is a brass tube, whose upper extremity is screwed to and closed by the plug E. Within T is a second tube of glass, having at its upper end the rubber washer $r$, separating it from the valve-disk J. The interior of the valve-disk is connected with the interior of the glass tube by an opening in the disk, and with the exterior air or water by ducts opening at $f$, Fig. 1. Within the disk is the rubber valve $o$, held down by a spring.

The lower extremity of the brass tube T is screwed to a metal piece containing a chamber, V, and inwardly threaded at the bottom to receive a second valve-disk containing a valve, $b$, which opens or shuts off communication between the interior of the glass tube $a$ and the outside air or water, and is held in its place by the spring I. At $r$ is a rubber washer, making the glass tube air-tight.

$m\ c$ are apertures connecting the valve-chamber V and exterior.

$d$ is a lever used to open the valve-chamber and allow egress to the water contained in the tube.

L is lead for sinking the indicator.

X is a counter-threaded bolt for attaching the lead L, having a rubber cushion, S, and fastened at its lower extremity by the nut $t$.

P is a rubber cushion to prevent jars, and on which is placed the tallow used to ascertain whether the indicator has reached bottom.

$u$ is a graduated scale showing the pressure of the water at any given depth, that portion of the scale for indicating low pressures being so arranged as to be read with the instrument inverted.

The lead L is made removable by means of the bolt and nut, so that lighter or heavier weights may be used at will, according to the speed of the vessel, size of the line, depth to be reached, or strength of the current.

The device shown at the upper portion of the indicator, including the valve-disk J, valve $o$, and connecting-ducts, are designed to allow the escape of air when, upon rising toward the surface of the water, the interior pressure of air becomes greatly in excess of the outside pressure of water, thus preventing the instrument from bursting, and also to prevent the pumping action which would otherwise result from the alternate rise and fall of the waves.

To operate the invention from a moving vessel, the kite H is fastened by the loop $h$ to the shackle A, and by the loop F to the end of the sounding-line. The indicator is then allowed to sink through the water, care being taken to pay out the line with sufficient rapidity to counteract the motion of the vessel. As the indicator sinks the increasing pressure of the water opens the lower valve and compresses the air contained in the tube, the upper valve meanwhile being retained in position by the same pressure. When the indicator touches bottom the inside and outside pressure are the same and the lower valve is closed. When the line becomes taut the action of the kite brings the indicator to the surface, and from thence it is drawn in. During its upward progress the pressure lessens upon the outside, and within remains the same, and, in consequence, the upper valve is opened and the air gradually escapes. Upon examination the depth of the water is indicated on the graduated scale $u$.

When soundings are taken from a motionless object, and in calm water, the indicator is operated without the use of the kite.

When soundings are taken in shoal water the pressure is often not sufficient to force the water above the valve-chamber into the tube, and hence no registry is made of said pressure. To obviate this difficulty, when the indicator has been drawn from the water, and the pressure is desired to be known, the instrument is reversed, and the water flows from the valve-chamber into the tube, where the pressure is gaged by the reverse scale formed on the tube for that purpose.

The lever $d$ is useful for emptying the tube, since otherwise the action of the valve-springs would not allow all the water to escape.

I am aware that instruments for sounding, consisting of a tube with valves at either end, have been already in use; but these, from their construction, are found to be inaccurate and of no use whatever when used from a moving ship. In heavy seas, or when the vessel is in motion, they are liable to be tilted, and the water rushing through drives the air from the tube. I do not broadly claim an instrument of such construction; but What I do claim is—

1. The bathometer-tube described, having an enlargement or chamber at the lower end, and a graduated stem marked so as to read the smaller indications when held in an inverted position, and the larger indications when held in its normal position, substantially as described.

2. In a bathometer-tube, the outwardly-opening valve at the upper end, for the purpose of relieving excessive internal pressure on the bathometer when withdrawn from a great depth.

JAMES ARSCOTT DAVIDSON.

Witnesses:
    E. T. MOSELY,
    JOHN MENZIES.